Figure 1:
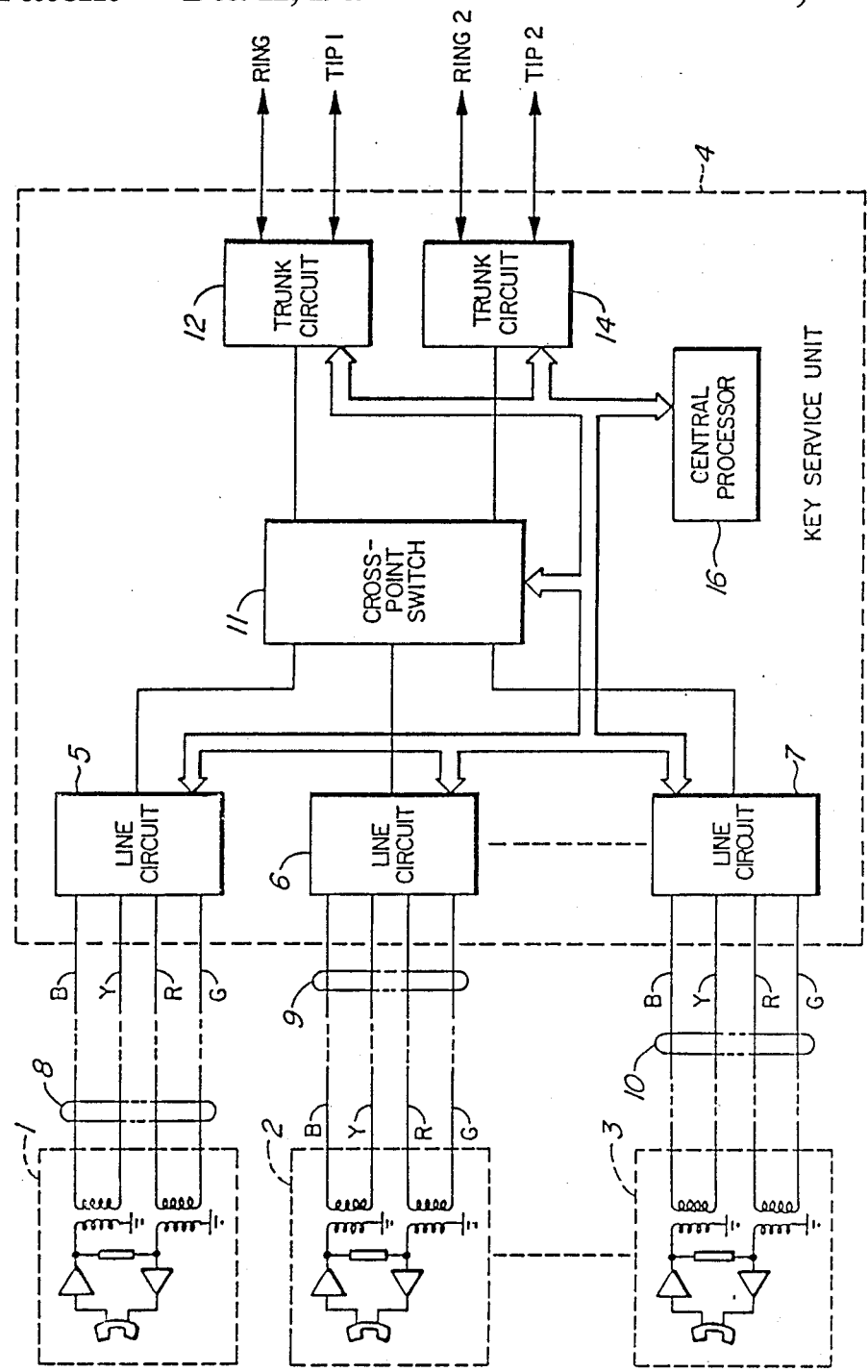

United States Patent [19]

Molnar

[11] Patent Number: 4,887,293
[45] Date of Patent: * Dec. 12, 1989

[54] TRUNK CIRCUIT WITH LOOP LENGTH GAIN EQUALIZATION

[75] Inventor: Gerald Molnar, Ottawa, Canada

[73] Assignee: Mitel Corporation, Kanata, Canada

[*] Notice: The portion of the term of this patent subsequent to Feb. 23, 2005 has been disclaimed.

[21] Appl. No.: 158,347

[22] Filed: Feb. 22, 1988

Related U.S. Application Data

[63] Continuation-in-part of Ser. No. 829,907, Feb. 18, 1986, Pat. No. 4,727,578.

[30] Foreign Application Priority Data

Oct. 11, 1985 [CA] Canada .................................. 492911

[51] Int. Cl.[4] ........................ H04M 1/00; H04M 1/76
[52] U.S. Cl. .................................. 379/164; 379/165; 379/166; 379/340; 379/347; 379/391; 379/400
[58] Field of Search .............................. 379/156–166, 379/387, 391, 394, 398, 400, 402–404, 340, 347

[56] References Cited

U.S. PATENT DOCUMENTS

| | | | |
|---|---|---|---|
| 4,079,212 | 3/1978 | Sasai ..................... | 379/159 |
| 4,088,846 | 5/1978 | McEowen ................. | 379/159 |
| 4,132,863 | 1/1979 | Smith ..................... | 379/400 |
| 4,228,323 | 10/1980 | Feiner .................... | 379/340 |
| 4,268,716 | 5/1981 | Groves et al. ............ | 379/158 |
| 4,268,723 | 5/1981 | Taylor .................... | 379/387 |
| 4,315,107 | 2/1982 | Ciesielka et al. .......... | 379/400 |
| 4,453,037 | 6/1984 | Terry ..................... | 379/400 |

FOREIGN PATENT DOCUMENTS 1157125  11/1983  Canada ............................... 379/398

OTHER PUBLICATIONS

T. Zanidakis, "Length Compensated Hybrid Circuit", Western Electric Technical Journal, No. 65, Jan. 1982, pp. 27, 28.

Primary Examiner—Jin F. Ng
Assistant Examiner—Wing F. Chan
Attorney, Agent, or Firm—Alan H. Levine

[57] ABSTRACT

A key telephone system comprised of a key service unit connected to a plurality of local sets via four-wire conductors for providing full duplex signal communication between the key service unit and sets. Signals are carried by a first pair of each of the conductors for unidirectional transmission of signals from each set to the key service unit, and the remaining pair of conductors carries signals transmitted by the key service unit for reception by one or more of the sets. Four-to-two wire signal conversion and line impedance balancing is effected by one or more trunk circuits of the key service unit in the event one or more of the local sets are connected via the key service unit for communication between the sets and the outside telephone lines. As a result of separate undirectional communication paths being provided between individual ones of the subscriber sets and the key service unit, via the four-wire conductors, the impedance balancing function of the trunk circuits is independent of the length and quality of the four-wire conductors. Each of the trunk circuits preferably incorporates an electronic telephone circuit for performing the four-to-two wire signal conversion as well as AC and DC termination and loop length gain equalization for signals carried by the outside telephone lines. The key service unit and subscriber sets of the telephone system are inexpensive, compact and highly efficient as a result of minimizing the number of four-to-two wire conversions therein.

7 Claims, 5 Drawing Sheets

TRUNK CIRCUIT WITH LOOP LENGTH GAIN EQUALIZATION

This application is a continuation-in-part of application Ser. No. 829,907, filed Feb. 18, 1986, now U.S. Pat. No. 4,727,578, issued Feb. 23, 1988.

This invention relates in general to telephone systems, and more particularly to a key telephone system wherein a plurality of subscriber sets are connected to a key service unit via four wire conductors.

Prior art key telephone systems typically utilized a multiplicity of conductor pairs connected to a plurality of subscriber sets and terminated therein on a plurality of keys or buttons disposed on each set and associated with each line. An unwieldy bundle of wires extended from each set, resulting in poor system expandability and set portability.

In an effort to overcome the disadvantages of prior art multiple conductor key systems, and in light of recent advances in the telecommunications and electronic arts, a number of modern day key telephone systems have been designed which utilize four-wire conductors for establishing communication and signalling paths between the subscriber sets and a central control unit or key service unit (KSU).

One such prior art system is described in Canadian patent 1,169,597 issued to Trillium Telephone Systems on June 19, 1984. The Trillium patent discloses a key system wherein four-wire conductors extend between the subscriber sets and KSU, and wherein each of the two pairs of conductors comprising the four-wire conductors carry bidirectional audio signals for effecting audio communication between various ones of the sets and the KSU.

Another such key telephone system is described in U.S. Pat. No. 4,203,011 issued May 13, 1980 to TIE/-Communications, Inc. The patented TIE/Communications system also implements a pair of audio frequency communication paths on separate ones of the pairs of conductors comprising the four-wire conductors. The first pair of conductors is utilized for communication between a local subscriber set and an outside telephone line via the KSU, while the second pair of conductors establishes a communication path between various ones of the local subscriber sets.

Prior art key telephone systems typically employ hybrid circuits in each of the sets and in the line circuits of the KSU. The subscriber set hybrid circuits perform four-to-two wire conversions of signals between unidirectional handset microphone and earpieces of the set and at least one of the bidirectional conductor pairs. The line interface circuits typically perform a two-to-two wire conversion of signals between one of the balanced bidirectional conductor pairs and an unbalanced bidirectional two-wire conductor such as a junctor connected to a crosspoint switching matrix of the KSU. Alternatively, the line interface circuits may be designed to perform a two-to-four wire conversion of signals between the bidirectional conductor pair and unidirectional receive and transmit circuits (i.e. for connection to a CODEC).

The hybrid circuit incorporated in prior art subscriber sets also typically includes a balancing network for transmitting a small portion of signal, known as side tone, from the handset microphone to the earpiece. Provision of side tone in the handset is important in order that a person can hear his or her own voice in the handset earpiece for determining how loudly to speak. Side tone must be at an appropriate level since too much side tone may cause a person to speak too softly for good reception by a remote party, and conversely, too little side tone may cause the person to speak loudly.

Key telephone systems also typically include a plurality of trunk circuits for interfacing the KSU to one or more outside telephone lines. The trunk circuits typically provide AC and DC termination of the outside line or subscriber loop extending between the KSU and a remote central office, and effect a two-wire to two-wire conversion of audio signals between the outside line and the aforementioned bidirectional unbalanced junctor.

It has been found that the AC termination characteristics of prior art trunk hybrid circuits are affected by the length of the local two-wire loop extending between the subscriber set and key service unit, as well as by the provision of balancing networks within the subscriber sets. The cumulative impedance of the balancing networks and two-wire subscriber loops are reflected via coupling through the KSU line circuit to the trunk circuit, resulting typically in poor outside line impedance matching characteristics.

In the present unregulated market for telephony products, it is an advantage to desensitize telephone systems to factors which are out of control of a customer (e.g. quality and length of internal wiring).

According to the present invention, a key telephone system is provided wherein each subscriber set is connected to the key service unit via four-wire conductors and wherein each pair of conductors carries unidirectional audio signals between the subscriber set and key service unit. No hybrid circuits are employed within the sets, and a first one of the conductor pairs carries audio signals transmitted from a handset microphone of the set to the KSU while the second conductor pair carries audio signals transmitted from the KSU for reception by a handset earpiece of the subscriber set. Accordingly, no four-to-two wire conversions are performed within the subscriber sets and the subscriber loop line impedance is not reflected to the trunk circuit. Thus, the operation of the trunk circuit balancing network is made independent of the local wiring, resulting in a system characterized by excellent line impedance specifications, simple and inexpensive design, and ease of adaptability for connection to existing four-wire conductors in a home or office.

According to a preferred embodiment of the invention, each trunk circuit is comprised of an electronic telephone circuit for providing impedance balancing and generating side tone to the local sets when connected to the outside line. Internal connections between local subscriber sets are realized through a switching matrix of the KSU and side tone is generated at each subscriber set via a simple microprocessor controlled connection between the handset and microphone earpiece Furthermore, the electronic telephone circuit also provides loop length gain equalization of signals carried by the outside line. As is well known, the transmission level of a trunk line is a function of the trunk loop length extending between the trunk circuit and remote central office or PBX.

For example, in the event of a short local loop between a subscriber set and the KSU (or PABX) and a long loop between the KSU (or PABX) and central office, electrical isolation between the local and central office loops due to the KSU interface circuitry, results in the loop length compensation circuitry of the set reducing the transmit gain upon detecting the short local loop. This typically will result in degraded transmission performance due to the long loop between the central office and KSU.

Prior art trunk circuits have not hitherto provided for loop length gain equalization. Thus, the trunk circuit comprised of an electronic telephone circuit of the present invention can be applied advantageously to telephone systems employing 2-wire bidirectional signalling, digital transmission or other, between respective subscriber sets and key service unit, as well as to the preferred 4-wire unidirectional configuration of the present invention.

Figure 2:
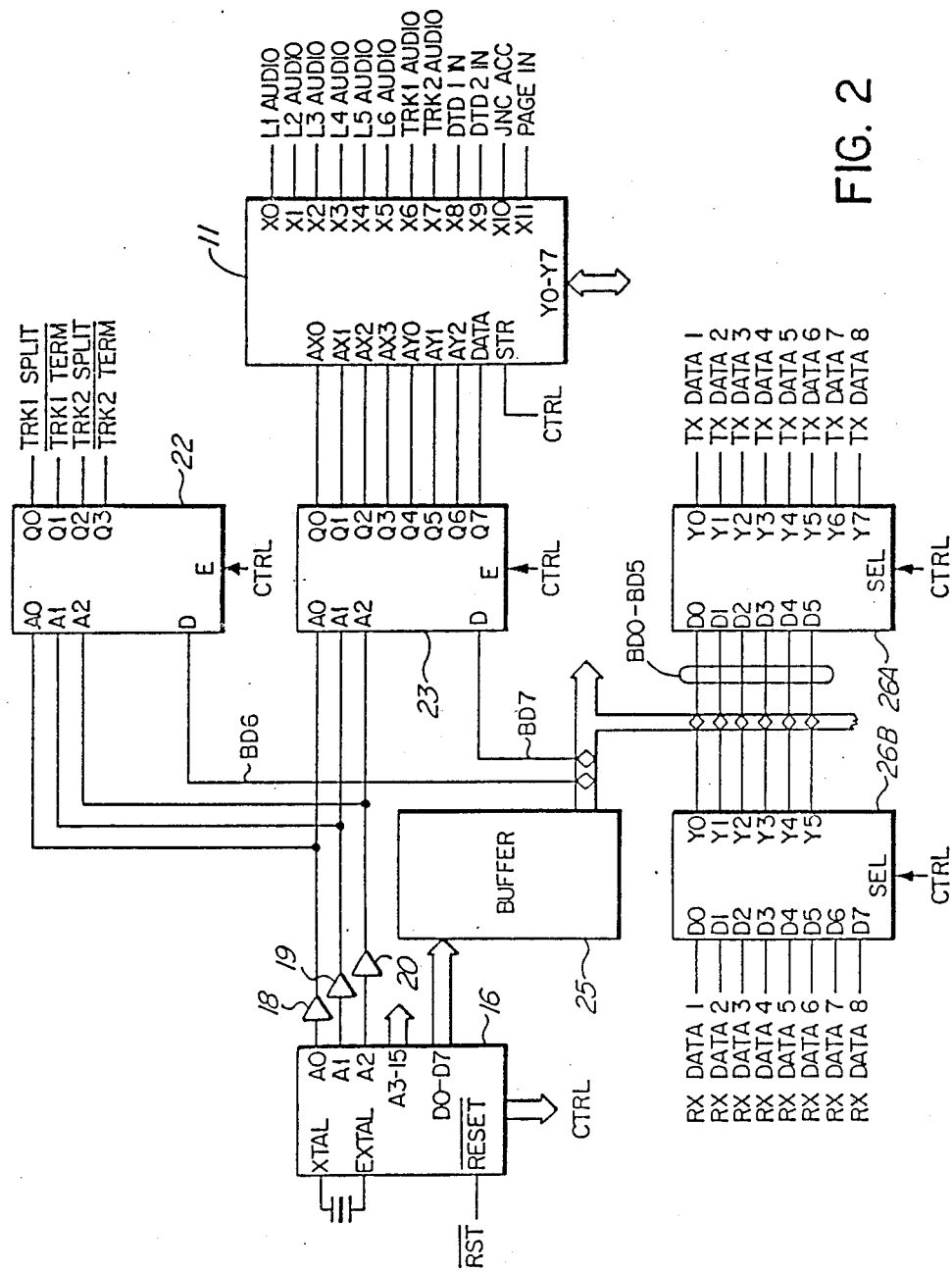
Figure 3:
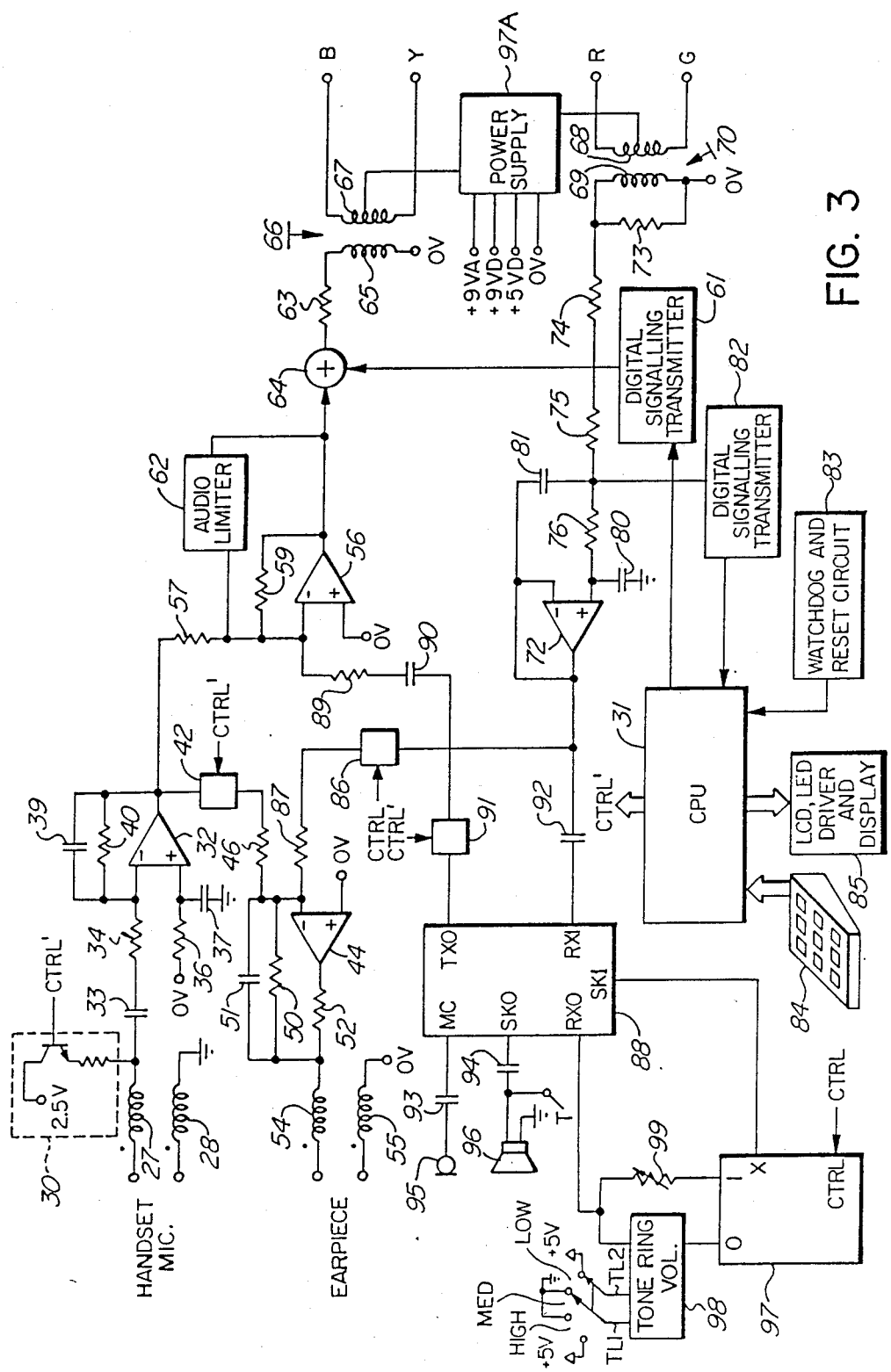
Figure 4:
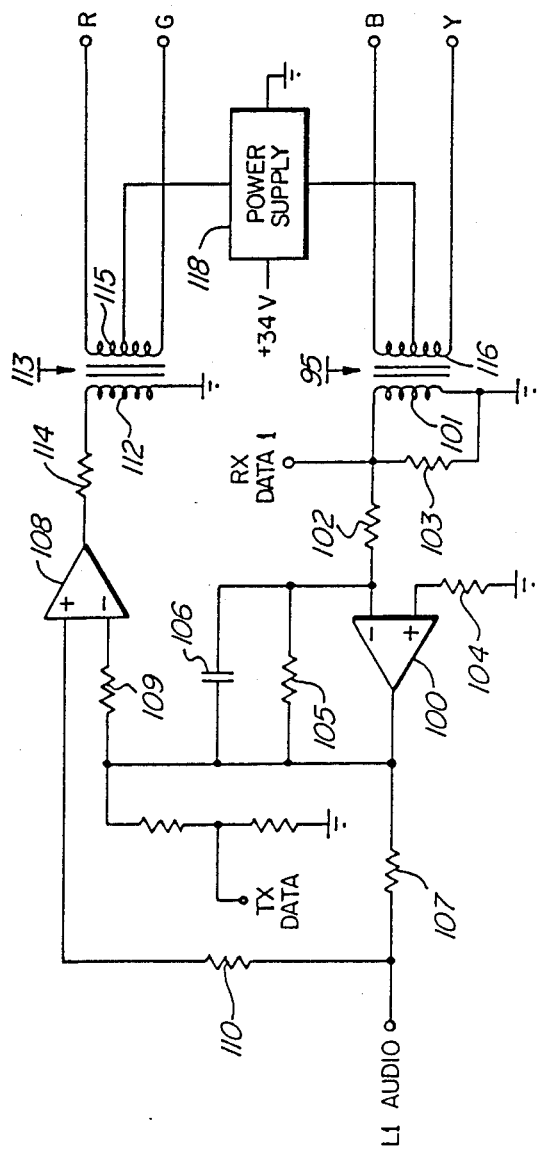
Figure 5:
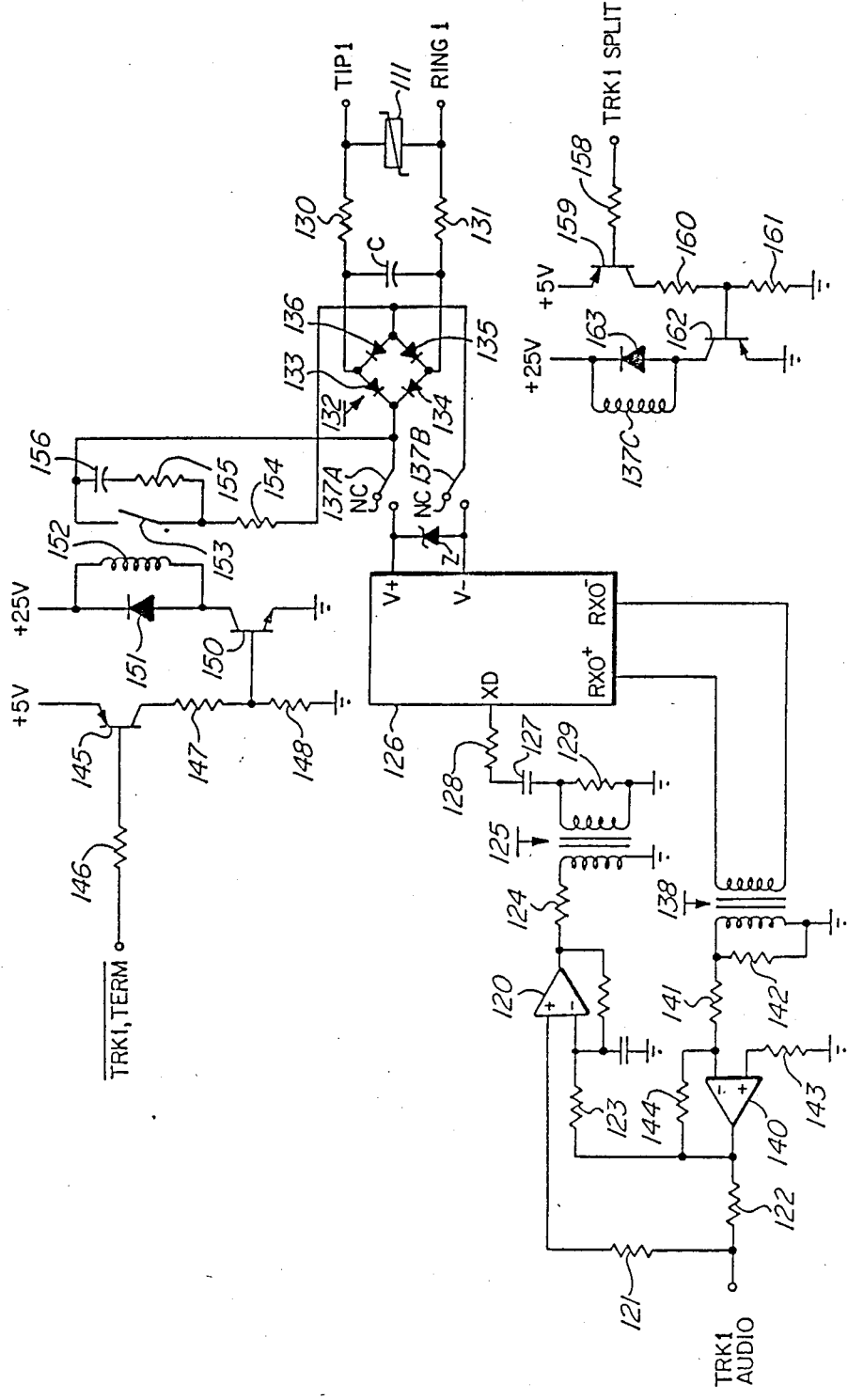

A better understanding of the present invention will be obtained with reference to the detailed description below in conjunction with the following drawings, in which:

FIG. 1 is a block diagram of a key telephone system according to the present invention, FIG. 2 is a block schematic diagram of a key service unit according to a preferred embodiment of the present invention, FIG. 3 is a block schematic diagram of a subscriber set according to the preferred embodiment, FIG. 4 is a schematic diagram of a line circuit according to the preferred embodiment, and FIG. 5 is a schematic diagram of a trunk circuit according to the preferred embodiment.

With reference to FIG. 1, a plurality of subscriber sets, shown generally by reference numerals 1, 2, . . . 3 are connected to a central control unit, such as a key service unit (KSU), shown generally as 4. A plurality of line circuits 5, 6, . . . 7 are connected to respective ones of the subscriber sets 1, 2, . . . 3 via four wire conductors 8, 9, . . . 10 for establishing transmission of audio signals between individual ones of the subscriber sets 1, 2, . . . 3 and line circuits 5, 6, . . . 7. For instance, black and yellow conductor pairs, labelled B and Y, carry audio signals transmitted by a microphone disposed in the corresponding one of subscriber sets 1, 2, . . . 3 for reception by KSU 4, and the red and green conductors labelled R and G, carry audio signals transmitted by KSU 4 for reception by an earpiece of the corresponding set 1, 2, . . . 3.

As discussed above, the advantage of using separate transmit and receive conductor pairs is that the AC balancing characteristics of trunk circuits, denoted as 12 and 14, are made independent of the length and quality of the conductors 8, 9, . . . 10. Also, since no internal hybrid circuits are utilized in subscriber sets 1, 2, . . . 3 the impedance of balancing networks normally associated with prior art subscriber set hybrid circuits is not coupled to the associated trunk circuit 12 or 14.

Each of the line circuits 5, 6, . . . 7 are connected to a crosspoint switching matrix 11, which in turn is connected to trunk circuits 12 and 14. While only two such trunk circuits are illustrated, it will be understood that fewer or greater than two trunk circuits may be connected to matrix 11 for realizing different user defined configurations of the system.

A central processor 16, which in the preferred embodiment is comprised of a microprocessor and associated address decoding circuitry etc., is connected to each of the line circuits 5, 6, . . . 7, crosspoint switching matrix 11, and trunk circuits 12 and 14 for supervising operation of the line, trunk and switching matrix circuits under control of call processing software, in a well known manner. Power is supplied to the subscriber sets 1, 2, . . . 3 from the KSU 4 via phantom power feed circuits described in greater detail below with reference to FIG. 3.

Each of the line circuits 5, 6, . . . 7 interfaces respective ones of the four-wire conductors 8, 9, . . . 10 with bidirectional audio terminals of crosspoint switching matrix 11, as described in further detail below with reference to FIG. 4.

As discussed above, side tone is generated for individual ones of the subscriber sets 1, 2, . . . 3 by the trunk circuits 12 and 14 in the event a communication path is established trough crosspoint switching matrix 11 between one of the sets and the one or more outside lines. However, side tone is generated within the subscriber sets 1, 2, . . . 3 themselves in the event a communication path is established between two or more of the local subscriber sets, as described below with reference to FIG. 3. Thus, since no balancing networks are employed within the subscriber sets, the complex impedance balancing capabilities of trunk circuits 12 and 14 are not affected by the length or quality of the conductors 8, 9, . . . 10.

FIG. 2 illustrates a simplified schematic diagram of the audio switching circuitry of the key service unit 4. Address lines A0, A1 and A2 of processor 16 are connected via buffers 18, 19 and 20 to address inputs A0, A1 and A2 of eight bit latches 22 and 23. Enable inputs E of latches 22 and 23 are connected to a control bus CTRL for carrying control signals generated by the central processor 16.

Address lines A3–A15 are connected to additional circuitry of KSU 4, such as random access and read only memories, interrupt circuits and digital signalling circuits etc., which do not form part of the present invention.

An eight bit data port D0–D7 of processor 16 is connected to an eight bit buffer 25. Data lines BD6 and BD7 from buffer 25 are connected to the D inputs of eight bit latches 22 and 23 respectfully. The Q0, Q1, Q2 and Q3 output terminals of latch 22 carry control signals denoted as TRK 1 SPLIT, TRK 2 TERM, TRK 2 SPLIT and TRK 2 TERM respectively. These control signals are used for controlling splitting and terminating of the trunk circuits 12 and 14 discussed above with reference to FIG. 1 and in greater detail below with reference to FIG. 5.

Output terminals Q0–Q3 of latch 23 are connected to the AX0–AX3 address inputs of crosspoint switching matrix 11, output terminals Q4 and Q5 of latch 23 are connected to the AY1 and AY2 inputs of switching matrix 11, while output terminal Q7 is connected to a DATA input of switching matrix 11.

Signal ports X0–XS of crosspoint switching matrix 11 are connected to bidirectional audio lines L1 AUDIO-L6 AUDIO connected to six corresponding line circuits (such as line circuits 5, 6, . . . 7 illustrated in FIG. 1). Bidirectional trunk audio lines TRK 1 AUDIO and TRK 2 AUDIO are connected between trunk circuits (such as circuits 12 and 14) of KSU 4 and to the X6 and X7 audio signal ports of crosspoint is switching matrix 11.

Audio ports X8 and X9 are connected to bidirectional lines DTD 1 IN and DTD 2 IN, connected to a pair of dial tone detectors, not shown, while the X10 port is connected to a junctor access line JNC ACC, and the X11 port is connected to a PAGE IN audio line, for public address paging According to the preferred embodiment, individual ports of crosspoint switching matrix 11 may be interconnected for establishing communication between various ones of the subscriber sets, outside lines, dial tone detectors, etc. For instance, a call may be placed between adjacent subscriber sets (such as sets 1 and 2), between a subscriber set and an outside line (such as subscriber set 1 and the outside line connected to trunk circuit 12), between three subscriber sets (such as 1, 2, . . . 3) or between one subscriber set and two outside lines or two subscriber sets and one outside line.

According to a successful prototype, crosspoint switching matrix 11 is an 8×12 crosspoint switching matrix such as an SGS model M093. In order to connect one of the ports X0-X11 to a junctor, addressing information is applied to the switch 11 via the Q0-Q7 output terminals of latch 23. A junctor strobe signal in the form of a logic high pulse, is generated by processor 16 and applied to control bus CTRL and therefrom to the strobe input STR of switch 11.

The length of time required to establish a connection within the model M093 switching matrix is relatively long in comparison to the speed of operation of processor 16. Accordingly, latch 23 is utilized to interface the relatively low speed switching matrix 11 and high speed processor 16. However, in the event of switching matrix is utilized which operates at a speed compatible with processor 16, latch 23 may be eliminated and the address inputs (such as AX0-AX3 and AY1-AY2 of matrix 11) can be connected directly to a data bus of the processor 16.

Tables 1 and 2 are truth tables for illustrating the connection of various ports of crosspoint switch 11 in response to various address signals being applied to the address inputs thereof, according to the successful prototype. The Y0-Y7 terminals of crosspoint switching matrix 11 are junctor terminals for connection to one or more external expansion ports, etc, and a logic high signal applied to the DATA input of switch 11 establishes a connection between the selected one of the audio ports X0-X11 and junctor terminal s Y0-Y7.

TABLE 1

| Connection | AY2 | AY1 | AY0 |
|---|---|---|---|
| Y7 (junctor 7) | 0 | 0 | 0 |
| Y6 (junctor 6) | 0 | 0 | 1 |
| Y5 (junctor 5) | 0 | 1 | 0 |
| Y4 (junctor 4) | 0 | 1 | 1 |
| Y3 (junctor 3) | 1 | 0 | 0 |
| Y2 (junctor 2) | 1 | 0 | 1 |
| Y1 (junctor 1) | 1 | 1 | 0 |
| Y0 (junctor 0) | 1 | 1 | 1 |

TABLE 2

| Connection | AX3 | AX2 | AX1 | AX0 |
|---|---|---|---|---|
| L1 AUDIO | 0 | 0 | 0 | 0 |
| L2 AUDIO | 0 | 0 | 0 | 1 |
| L3 AUDIO | 0 | 0 | 1 | 0 |
| L4 AUDIO | 0 | 0 | 1 | 1 |
| L5 AUDIO | 0 | 1 | 0 | 0 |
| L6 AUDIO | 0 | 1 | 0 | 1 |
| TRK1 AUDIO | 1 | 0 | 0 | 0 |
| TRK2 AUDIO | 1 | 0 | 0 | 1 |
| DTD 1 IN | 1 | 0 | 1 | 0 |
| DTD 2 IN | 1 | 0 | 1 | 1 |
| JNC ACC | 1 | 1 | 0 | 0 |
| PAGE IN | 1 | 1 | 0 | 1 |

Thus, in operation, in order to connect one of the subscriber sets (for example set 1) for communication with an outside line, for example tip and ring leads TIP 1 and RING 1 connected to trunk circuit 12, an address signal of the form 0000 is applied to the AX3-AX0 inputs of switching matrix 11 and a junctor strobe signal pulse is applied to the STR input. Subsequently, an address signal of the form 1000 is applied to the AX3-AX0 inputs of switching matrix 11 and a further junctor strobe signal is applied to the STR input, thereby completing a communication path between the L1 AUDIO and TRK 1 AUDIO lines.

In addition to audio signal switching, KSU 4 generates and transmits data signals such as digital control signals to the one or more subscriber sets 1, 2, . . . 3. A digital signalling transmitter 26A has D0-D5 data inputs thereof connected to buffered data lines BD0-BD5 connected to buffer 25. Multiplexed data outputs Y0-Y7 of transmitter 26A are connected to data lines DX DATA 1-DX DATA 8 respectively, for connection to predetermined ones of the line circuits 5, 6, . . . 7 Similarly, a digital signalling receiver 26B has multiplex data inputs D0-D7 connected to receive data lines RX DATA 1- RX DATA S respectively for receiving data signals carried by predetermined ones of the line circuits 5, 6, . . . 7. The receive data signals are applied to the BD0-BD5 buffered data line from Y0-Y5 outputs of receiver 26B, select inputs SEL of each of the digital signalling transmitter 26A and receiver 26B are connected to the control bus CTRL of processor 16.

FIG. 3 illustrates a block schematic diagram of a proprietary subscriber set, such as set 1 shown in FIG. 1, according to the successful embodiment. An electret handset microphone is typically connected to the subscriber set via radio frequency choke coils 27 and 28. A control circuit 30 selectively enables a 2.5 volt power supply for supplying power to the microphone in response to reception of a control signal generated by a CPU 31 and carried by a local control bus CTRL'.

Signals received by a connected handset microphone are AC coupled to an inverting input of a high gain differential amplifier 32 via a high pass filter comprised of capacitor 33 and resistor 34, for filtering low frequency hum, etc. A non-inverting input of amplifier 32 is connected via resistor 36 to a source of zero volts and via a capacitor 37 to ground, for filtering noise appearing on the voltage source. An output of amplifier 32 is reconnected to the inverting input thereof via low pass filtering capacitor 39 and resistor 40 in a well known manner.

The output of differential amplifier 32 is further connected via transmission gate 42 to an inverting input of differential amplifier 44 via resistor 46. Transmission gate 42 is enabled and disabled upon reception of a predetermined control signal carried by the control bus CTRL' connected to CPU 31. A non-inverting input of amplifier 44 is connected to the source of zero volts. An output of amplifier 44 is connected via a low pass filter comprised of resistor 50 and capacitor 51 via an output protection resistor 52. Resistor 52 is further connected to RF choke coil 54. A handset earpiece is typically connected in a circuit to the subscriber set via coils 54 and 55 in a well known manner.

According to the successful prototype of the present invention an electret microphone having a 510 ohm bias resistor was connected to the set via coils 27 and 28, and a dynamic earpiece was connected via coils 54 and 55.

The output of differential amplifier 32 is connected to an inverting input of differential amplifier 56 via protection resistor 57. The non-inverting input of amplifier 56 is connected to the source of zero volts. A feedback resistor 59 is connected to the inverting input of amplifier 56 and an output thereof in a well known manner.

The output of amplifier 56 is connected to a first input of a summing circuit 64 which is connected via protection resistor 63 to a primary coil 65 of an audio transformer shown generally as 66. A secondary coil 67 of transformer 66 is connected to the black and yellow leads of a four-wire conductor (such as conductor 6 shown in FIG. 1). A digital signalling transmitter 61 is connected to a second input of summing circuit 64 for superimposing digital control signals on audio signals received from amplifier 56, for transmission along the B and Y leads via transformer 66, and under control of CPU 31. The transmitted digital control signals are received in KSU 4 via digital signalling receiver 26B discussed with reference to FIG. 2.

An audio limiting circuit 62 is connected to the inverting input and to the output of amplifier 56 in order to regulate the amplitude of audio signals applied to amplifier 56 from the microphone. This circuit ensures that the amplitude of the audio signals transmitted via amplifier 56 do not exceed power supply voltage rails, thereby ensuring data integrity of the transmitted digital signals superimposed on the audio signals. Handset and hands free microphones are preamplified in amplifiers 32 and 56 respectively in order to generate signal levels having sufficient signal to noise ratios for ensuring proper operation of audio transformer 66.

Signals received from the R and G leads of the four-wire conductor are coupled via primary and secondary coils 68 and 69 of audio transformer 70 to a differential amplifier 72. An impedance resistor 73 (preferably 600 ohms) is connected across secondary coil 69, and series input resistors 75 and 76 are connected from coil 69 to a non-inverting input of amplifier 72. An output of amplifier 72 is connected to an inverting input thereof, and a filtering capacitor 80 is connected from the non-inverting input of amplifier 72 to ground, and a further filtering capacitor 81 is connected from the inverting input of amplifier 72 to the node connecting resistors 75 and 76. The node connecting resistors 75 and 76 is further connected to a digital signalling receiver 82, which in turn is connected to CPU 31. Amplifier 72 in conjunction with capacitors 80 and 81, acts as a low pass filter for filtering digital control signals transmitted by KSU 4 via transmitter 26A discussed with reference to FIG. 2, and carried by the R and G leads, from being transmitted to the handset earpiece.

A watch dog and reset circuit 83, keyboard 84 and LCD/LED driver and display 85 are also connected to CPU 31 in a well known manner.

Audio signals amplified in differential amplifier 72 are applied to the inverting input of differential amplifier 44 via transmission gate 86 and resistor 87. Transmission gate 86 is enabled in response to reception of a control signal generated by CPU 31, and carried by the control bus CTRL'

Thus, with transmission gate 86 and control circuit 30 enabled communication will be established via the B, Y, R and G leads between the handset connected to the subscriber set via transmission coils 27, 28, 54 and 55, and the KSU 4.

The outputs of amplifiers 32 and 72 are also connected in respective circuit paths to transmit and receive terminals TXO and RXI respectively of a hands free circuit 88 (MC 34018). In particular, the output of amplifier 32 is connected via resistors 57 and 89, capacitor 90 and transmission gate 91 to the TXO terminal, and the output of amplifier 72 is connected to the RXI input via AC coupling capacitor 92. Transmission gates 86 and 91 are enabled in response to receiving a predetermined control signal generated by CPU 31 and carried by the control bus CTRL', in a well known manner. Microphone input terminal MC and speaker amplifier output SKO, of hands free circuit 88 are connected via AC coupling capacitors 93 and 94 to a microphone and speaker 95 and 96 respectively. Thus, with control circuit 30 and transmission gate 86 disabled and transmission gate 91 enabled, audio communication between the subscriber set and KSU 4 is conducted in hands free mode. Also, an external speaker terminal or jack T, is provided for connecting an external speaker, thereby accommodating paging and public address announcements, etc.

A volume control circuit is connected to hands-free circuit 88, and is comprised of analog multiplexer 97 (CMOS 4053) having a first input 0 connected to a TONE RINGER VOLUME circuit 98 comprised of a plurality of CMOS multiplexers, resistors, capacitors and transistors, and a second input 1 connected to a speaker volume potentiometer 99. Circuit 98 and potentiometer 99 are connected together and to an output RXO of a receive signal attenuate circuit of hands-free circuit 88, and an output X of multiplexer 97 is connected to speaker amplifier input SKI of hands-free circuit 88. In operation, CPU 31 generates an inhibit control signal for application to multiplexer 97 via control bus CTRL' in response to receiving a tone ringing signal from the R and G leads, for selecting signals on the 0 input, thereby inhibiting the volume potentiometer 99, and enabling circuit 98. Thus, the volume of the tone ringing signals can be adjusted via logic level signals applied to terminals TL1 and TL2 of TONE RINGER VOLUME circuit 98 from CPU 31, resulting in three levels of ringer volume, as follows: for HIGH volume TL1=1 and TL2=0; for MEDIUM volume TL1=0 and TL2=0; and for LOW volume TL1l=0 and TL2=1. Alternatively, during normal operation of the hand-free circuit 88, CPU 31 generates an enabling control signal to multiplexer 97 for selecting potentiometer 99 to be connected to the 1 input thereof, in order to control the volume of audio signals received from the R and G leads for broadcasting via speaker 96.

As discussed above side tone is generated in the set in response to transmission gate 42 being enabled, in the event it is desired to establish communication between one or more of the local subscriber sets 1, 2, . . . 3. Side tone is inhibited during operation of the set in hands-free mode.

Coils 67 and 68 of audio transformers 66 and 70 respectively, are center tapped for implementing a phantom power feed system for extracting DC battery voltage from the B, Y, R and G leads, as described in greater detail below with reference to FIG. 4. Power supply circuit 97A transforms the received DC battery voltage into a plurality of power supply voltages, namely separate +5 volt supplies for analog and digital circuitry as well as separate +9 volt supplies for the analog and digital circuitry.

An advantage of using a four-wire phantom feed circuit over traditional two-wire circuits is that approximately one-half the DC resistance is imposed between the KSU 4 and each of the sets 1, 2, . . . 3, than with prior art two-wire phantom feed circuits, since the center tapped coils act as a pair of parallel impedances connected to the set (in contrast to the series impedance of prior art two-wire circuits) resulting in less voltage drop across the lines 8, 9, . . . 10, than in traditional two-wire circuits.

The set is of simple design, requiring fewer components than prior art subscriber sets, and thereby resulting in low cost.

FIG. 4 is a schematic diagram of line circuit 5, shown in FIG. 1, line circuits 6...7 being of substantially similar design. Signals received on the B and Y leads are coupled via transformer 98 to differential amplifier 100 for application to the L1 AUDIO terminal, and therefrom to the X0 input of crosspoint switching matrix 11 (FIG. 2). A secondary coil 101 of transformer 98 is connected via resistor 102 to the inverting input of amplifier 100, and an impedance matching resistor 103 (preferably 600 ohms) is connected across the secondary coil 101. The non-inverting input of amplifier 100 is connected to ground via resistor 104, and an output of amplifier 100 is connected to the inverting input thereof via resistor 105 and capacitor 106. The output of amplifier 100 is connected to the L1 AUDIO terminal via output resistor 107 and to an inverting input of amplifier 108 via input resistor 109.

Signals received from crosspoint switching matrix 11 via the L1 AUDIO terminal are applied to a non-inverting input of amplifier 108 through input resistor 110. The resistance of resistors 109, 107 and 110 are chosen such that signals output from amplifier 100 are applied with equal amplitude to the inverting and non-inverting inputs of amplifier 108 so as to be cancelled therein.

An output of amplifier 108 is connected to a primary coil 112 of an audio transformer 113 via an output resistor 114. Secondary coils 115 and 116 of transformers 113 and 98 are connected to a power supply circuit 118 for generating the aforementioned DC battery voltage supplied to the associated one of the subscriber sets 1, 2, . . . 3.

Digital control signals received from the B and Y leads (transmitted by transmitter 61 discussed with reference to FIG. 3) are applied to the RX DATA 1 terminal for transmission to digital signalling receiver 26B discussed above with reference to FIG. 2. Similarly, digital control signals transmitted by digital signalling transmitter 26A of the KSU 4, are applied to the TX DATA 1 terminal for reception and translation via amplifier 108 to the R and G leads, and subsequent reception by receiver 83 discussed with reference to FIG. 3.

FIG. 5 is a schematic diagram of trunk circuit 12 shown in FIG. 1, trunk circuit 14 being of substantially identical design. Signals appearing on the X6 signal port of crosspoint switching matrix 11 shown in FIG. 2 are received by the TRK 1 AUDIO terminal and applied to a non-inverting input of differential amplifier 120 via input resistor 121, and via resistors 122 and 123 to an inverting input of amplifier 120. The values of resistors 121, 122 and 123 are chosen such that signals appearing on the TRK 1 AUDIO terminal are differentially received by amplifier 120 and applied therefrom via output resistor 124 to audio transformer 125 and coupled thereacross for reception by a transmit terminal XD of electronic telephone circuit 126, via AC coupling capacitor 127 and resistor 128. An impedance matching resistor 129 is connected across a secondary coil of transformer 125 in the usual manner.

In operation, telephone circuit 126 (TP 5700) receives signals from crosspoint switching matrix 11 and performs well known hybrid functions such as generation of side tone etc., and transmits the received signals differentially from V+ and V− terminals thereof.

The tip and ring terminals of the outside line, TIP 1 and RING 1, are connected via protective resistors 130 and 131 to a diode bridge 132. A capacitor C is connected to resistors 130 and 131 for filtering radio frequency signals carried by the TIP 1 and RING 1 leads. Also, a varistor 111 is connected to the tip and ring leads TIP 1 and RING 1, for protection against lightning strikes and other high voltage transient signals which may appear on the line. Similarly, a zener diode Z is connected to the V+ and V− terminals of telephone circuit 126 for protection against transient voltage surges. Diode bridge 132 is comprised of a first diode 133 having an anode connected to resistor 130 and a cathode thereof connected to a cathode of a diode 134. The anode of diode 134 is connected to the cathode of diode 135, and the anode of diode 135 is connected to the anode of 136. The anode of diode 134 and cathode of diode 135 are connected together and to protective resistor 131.

The cathodes of diodes 133 and 134 are connected to a first break contact 137A of a relay comprised of break contacts 137A, 137B and actuator coil 137C. The anodes of diodes 135 and 136 are connected to break contact 137B of the relay. Break contacts 137A and 137B are connected to terminals V+ and V−, respectively, of telephone circuit 126. Thus, in the event the trunk circuit is in an unsplit state wherein break contacts 137A and 137B are closed, signals appearing on the V+ and V− terminals of telephone circuit 126 are applied via diode bride 132 and protective resistors 130 and 131 to the tip and ring leads, TIP 1 and RING 1 for transmission via the outside line to an external central office or PBX.

Signals received from an external central office or PBX are applied to the V+ and V− terminals of circuit 126 via protective resistors 130 and 131, and diode bridge 132. The telephone circuit 126 performs a two-to-four wire signal conversion such that the received signals are applied to the RX0+ and RX0− terminals thereof. The signals thus applied, are coupled across audio transformer 138 and applied to an inverting input of differential amplifier 140 via input resistor 141. An impedance matching resistor 142 is connected across a secondary coil of transformer 138 in the usual manner. A non-inverting input of amplifier 140 is connected to ground via resistor 143 and an output of amplifier 140 is connected to the inverting input thereof via a feedback resistor 144, in a well known manner.

Thus, signals received from the tip and ring leads TIP 1 and RING 1, by telephone circuit 126, are applied to the RX0+ and RX0− terminals thereof and coupled via transformer 138 for amplification by amplifier 140 and applied therefrom to the TRK 1 AUDIO terminal via resistor 122.

Audio transformers 125 and 138 are utilized for providing electrical isolation between the circuit 126 and voltages appearing internally of the KSU 4.

As discussed above, the values of resistors 121, 122 and 123 are chosen such that signals appearing on the TRK 1 AUDIO terminal are differentially received by amplifier 120, yet signals transmitted from the output of amplifier 140 are applied with equal amplitude via resistors 121, 122 and 123 to the inverting and non-inverting inputs of amplifier 120, so as to be cancelled therein.

Side tone for a subscriber using one of the local subscriber sets, and communicating with an outside line via the trunk circuit 12, is provided by telephone circuit 126 in a well known manner.

In addition to performing signal translation and side tone generation, telephone circuit 126 provides DC termination of the outside line, balances the nominal line impedance of the TIP 1 and RING 1 leads, and performs loop length equalization for adjusting receive and transmit gains. It is believed that loop length equalization has not hitherto been provided in prior art trunk circuits.

Thus, whereas the preferred embodiment of the present invention relates to 4-wire unidirectional audio signal translation between the subscriber sets 1, 2 and 3 (FIG. 1) and respective line circuits 5, 6 and 7, the telephone circuit 126 may be advantageously incorporated within trunk circuits of a telephone system utilizing well known prior art 2-wire bidirectional signal translation between respective subscriber sets and line circuits via tip and ring leads.

Thus, it can be seen that side tone generation and impedance balancing are performed in a single circuit 126, as opposed to multiple circuits such as trunk circuits, line circuits and hybrid circuit resident in subscriber sets according to the prior art. Accordingly, the length of the four wire conductors 8, 9, . . . 10 has no effect on the impedance matching and side tone generation characteristics of the telephone circuit 126 of the trunk circuit.

By using a single chip electronic telephone circuit, such as circuit 126, considerable savings in cost and circuit board area are obtained over prior art trunk circuits, since all of the required hybrid functions of the trunk circuit are performed therein.

In addition to performing standard hybrid functions, trunk circuits 14 and 15 also incorporate circuitry for splitting and terminating the TIP 1 and RING 1 leads under control of processor 16 of KSU 4, in order to put incoming calls on hold, perform decadic dialling, etc.

This circuitry is comprised of a PNP transistor 145 connected to the Q1 output terminal of latch 22 (FIG. 2), via resistor 146. The collector of transistor 145 is connected to ground via voltage dividing resistors 147 and 148 and the emitter is connected to a +5 volt source. Thus, in response to a logic low signal appearing on the Q1 output terminal of latch 22, transistor 145 begins conducting current from the +5 volt source, through the emitter/collector junction and through the voltage dividing resistors 147 and 148 to ground. Hence, a forward biasing voltage is established between base and emitter terminals of an NPN transistor 150 such that current flows from a source of +25 volts through a relay coil 152 and the collector/emitter junction of transistor 150 to ground. A protective diode 151 is connected across coil 152 in the usual manner.

Make contact 153 closes in response to current being conducted, thereby connecting a terminating resistor 154 in a circuit to the TIP 1 and RING 1 leads, for matching the nominal impedance of the outside telephone line. Capacitor 156 and resistor 155 are connected across contact 153 for limiting the rate of change of voltage across contact 153 according to the RC time constant of resistor 155 and capacitor 156, thereby protecting against arcing across contact 153 in the event of an inductive line being connected to the TIP 1 and RING 1 terminals.

The Q0 output terminal of latch 22 is connected via a resistor 158 to a PNP transistor 159. An emitter terminal of transistor 159 is connected to a source of +5 volts, and the collector terminal thereof is connected via voltage divider resistors 160 and 161 to ground. The base of a further PNP transistor 162 is connected to the node connecting voltage divider resistors 160 and 161. The emitter of transistor 126 is connected to ground, and the collector terminal thereof is connected via trunk split relay coil 137C to the source of +25 volts. A protective diode 163 is connected across the coil 137C in a well known manner.

In order to split and terminate trunk circuit 12, processor 16 generates an address signal of the form A0=1, A1=0, and A2=0, and a data signal having a logic low value on the BD6 data line. In response, latch 22 generates a logic low signal from the Q1 output terminal thereof which causes make contact 153 to close, establishing the aforementioned termination circuit across the TIP 1 and RING 1 leads. Approximately 2 milliseconds later, processor 16 generates a further address signal wherein the A0, A1 and A2 address lines are each at logic low levels, and a data signal having a logic high level on the BD6 data line. In response, the Q0 output terminal of latch 22 goes to a logic high level, transistor 159 is biased off, transistor 162 is biased on and current flows through coil 137C for actuating break contacts 137A and 137B, thereby splitting the TIP 1 and RING 1 leads.

In order to generate dial pulse signals, the trunk circuit is split as described above, and contact 153 is successively opened and closed under control of signals applied to the TRK 1 TERM terminal. In this way, automatic speed dialing can be effected under control of processor 16.

Trunk circuit 14 is split and terminated in a similar manner, under control of signals appearing on the Q2 and Q3 output terminals of latch 22 corresponding to the TRK 2 SPLIT and TRK 2 TERM signals.

In summary, according to the present key telephone system, side tone is generated for the subscriber sets 1, 2, . . . 3 within dedicated telephone circuits resident in each trunk circuits 12 and 14 in the event the subscriber sets are connected through crosspoint switching matrix 11 to the trunk circuits via the four-wire conductors 8, 9, . . . 10 unidirectional signals.

Conceptually, the subscriber sets 1, 2, . . . 3 connected via four-wire conductors 8, 9, . . . 10, may be thought of as being analogous to handsets having long cords extending to the KSU 4, since four-wire unidirectional communication is maintained between the sets and KSU 4. Thus, simple and accurate impedance balancing and side tone generation are achieved in the key telephone system according to the present invention, independently of the length and quality of the station wiring.

A person skilled in the art understanding the present invention may conceive of other embodiments or variations thereof. For instance, the electomechanical relay contacts 137A, B and 153 employed in the trunk termination and splitting circuits can be replaced by well known solid state components, such as high power transistors. In addition, the trunk circuits 12 and 14 have been illustrated as being loop start trunk circuits, but can alternatively be ground start trunk circuits. Also, while the line circuit illustrated in FIG. 4 and the trunk circuit illustrated in FIG. 5 were described as performing two-to-four wire signal conversions, separate unidirectional transmit and receive communication paths can be maintained throughout the system. For instance, first and second crosspoint switching matrices may be utilized for switching transmit and receive signals respectively, between various ones of the subscriber sets and the outside lines.

Also, the key telephone system of the present invention may be utilized to interface one or more digital subscriber sets, microcomputers or two way radios in lieu of the subscriber sets discussed with reference to FIG. 3. Indeed, any full duplex apparatus having separate receive and transmit terminals, may be used. Thus, a computer could advantageously be substituted for one of the subscriber sets 1, 2, . . . 3 described with reference to FIG. 1, for sending and receiving digital data signals to and from the KSU 4.

As an alternative to using the preferred electronic telephone circuit, dedicated loop length gain compensation circuitry may be provided within the trunk circuits.

All such embodiments and variations are believed to be within the sphere and scope of the present invention as defined in the claims appended hereto.

I claim:

1. In a telephone system including voice switching means for connection to a plurality of subscriber sets via a plurality of local telephone conductors, and to at least one outside telephone line having a predetermined line impedance, a trunk circuit connected to each corresponding outside telephone line and to said switching means for connection to said telephone conductors for performing bidirectional signal translation between said telephone line and said conductors, said trunk circuit comprising means for performing loop length gain equalization of signals carried by a corresponding outside telephone line.

2. A trunk circuit as defined in claim 1, wherein said equalization means is comprised of an electronic telephone circuit.

3. A truck circuit as defined in claim 1, further including means for spliting and terminating the connection thereof to said corresponding outside telephone line.

4. A trunk as defined in claim 2, further including automatic speed dial means for successively splitting and unsplitting said connection thereof to said corresponding outside line, whereby decadic dial pulse signals are applied to said outside line.

5. A trunk circuit as defined in claim 1, further including means for matching said predetermined line impedance.

6. A trunk circuit as defined in claim 1, further including means for providing DC termination of said outside telephone line.

7. A trunk circuit as defined in claim 1, further including means for generating side tone in the event a communication path is established between at least one of said sets and said corresponding telephone line.

* * * * *